United States Patent [19]

Herring

[11] Patent Number: 4,767,390

[45] Date of Patent: Aug. 30, 1988

[54] APPARATUS FOR AND METHOD OF APPLYING HANDLE TO CARTON CLOSURE FLAP

[75] Inventor: Jack G. Herring, Anaheim, Calif.

[73] Assignee: Federal Paper Board Company, Inc., Montvale, N.J.

[21] Appl. No.: 7,085

[22] Filed: Jan. 27, 1987

[51] Int. Cl.[4] ........................ B31B 1/86; B32B 31/12; B65H 3/08; B65H 5/06

[52] U.S. Cl. ........................ 493/88; 493/123; 493/144; 493/379; 493/471; 53/134; 53/413; 156/539; 156/571; 156/582; 156/DIG. 40; 271/11; 271/100; 271/107

[58] Field of Search ........................ 493/88, 120, 123, 142, 493/144, 226, 379, 471, 909; 156/521, 539, 571, 582, DIG. 29, DIG. 39, DIG. 40; 53/134, 413; 271/11, 100, 101, 106, 107; 29/121.1

[56] References Cited

U.S. PATENT DOCUMENTS

| | | | |
|---|---|---|---|
| 1,207,149 | 12/1916 | Duvall | 271/100 |
| 1,771,652 | 7/1930 | Novick | 271/101 |
| 2,304,172 | 12/1942 | Heywood et al. | 271/1 |
| 4,194,442 | 3/1980 | Martelli | 493/123 |
| 4,619,726 | 10/1986 | Cook et al. | 156/571 |

FOREIGN PATENT DOCUMENTS

| | | | |
|---|---|---|---|
| 3145276 | 6/1983 | Fed. Rep. of Germany | 493/88 |

*Primary Examiner*—Frederick R. Schmidt
*Assistant Examiner*—William E. Terrell
*Attorney, Agent, or Firm*—Charles E. Brown; Charles A. Brown

[57] ABSTRACT

An applicator for applying elongated strip members to a moving member. The applicator is particularly adapted to apply handle assemblies to moving closure panels of containers such as cartons. Hot melt adhesive stripes are applied to the moving closure panel and thereafter a handle assembly is applied over the hot melt adhesive. The apparatus includes, in addition for moving containers at a uniform rate and spacing, a hopper overlying the path of movement, a picker device for periodically withdrawing a lowermost handle assembly from the hopper, and a combined guide and presser member for first receiving in guided relation an end of a withdrawn handle member remote from the picker device, and thereafter pressing the handle member against the adhesive strip beginning at the right end of the withdrawn handle assembly.

12 Claims, 2 Drawing Sheets

APPARATUS FOR AND METHOD OF APPLYING HANDLE TO CARTON CLOSURE FLAP

This invention relates in general to new and useful improvements in cartons having carrying handles, and more particularly to the application of such carrying handles to a carton closure flap after the carton has been erected, and normally after the carton has been filled.

In the past, carrying handles have been applied to cartons during the forming of the cartons in the blank stage. It has been found that the application of the handles as the carton blanks are being formed and glued slows down the carton manufacturing process. On the other hand, in accordance with this invention there has been developed an apparatus for and method of applying such handles to the carton closure flaps after the cartons have been erected and preferably after the cartons have been filled.

While the invention particularly relates to the application of handles to carton closure flaps, the apparatus and method may be utilized for applying other elongated strip members to other moving members.

With the above and other objects in view that will hereinafter appear, the nature of the invention will be more clearly understood by reference to the following detailed description, the appended claims, and the several views illustrated in the accompanying drawings.

Figure 4:
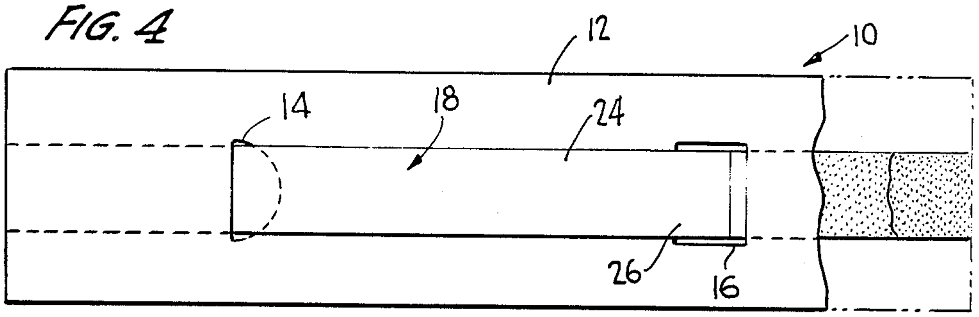
FIG. 4 is an enlarged plan view of a handle assembly to be applied in accordance with this invention, parts being broken away.
Figure 5:
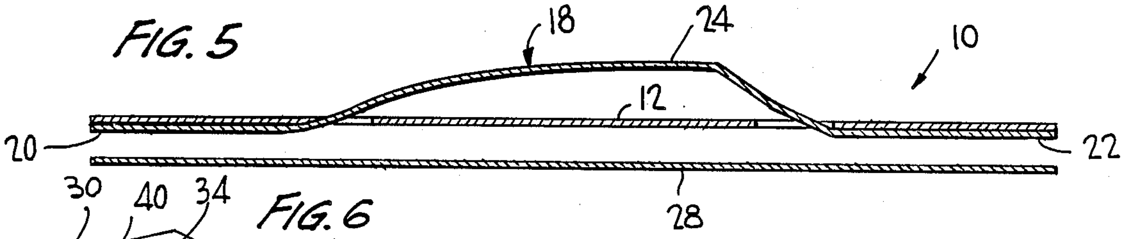
FIG. 5 is a longitudinal sectional view taken through the center of the handle assembly of FIG. 1 with an associated retaining strip in an exploded position.
Figure 6:
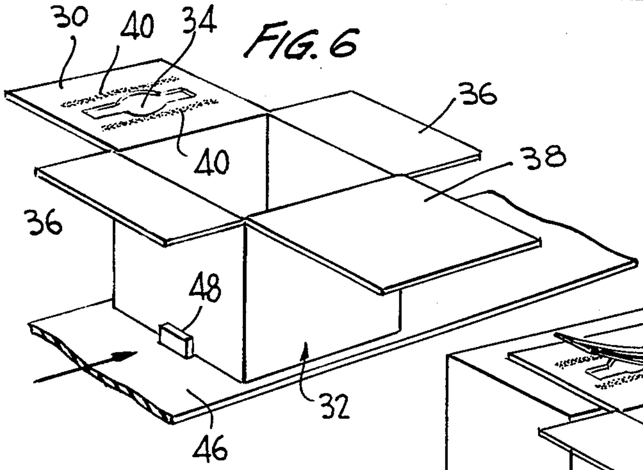
FIG. 6 is a schematic perspective view showing an erected carton mounted on a conveyor for moving at an uniform rate and having had hot melt adhesive applied to one of the closure panels thereof.

Referring now to the drawings in detail, it will be seen that there is illustrated in FIG. 4 a handle assembly which is to be applied to a closure panel of a container or carton. The handle assembly is generally identified by the numeral 10 and includes an elongated narrow web 12 which is reinforced against rupture. The web 12 is provided along the center line thereof with longitudinally spaced notches 14 and 16. A narrow handle member 18 is passed through the notches 14 and 16 so as to have end portions 20, 22 underlying the web 12 and suitably bonded thereto. A central portion 24 of the handle 18 overlies the web 12 and initially has a portion 26 which is reversely folded into the notch 16 so that the handle 18 lies flat against the web 12 while the central portion 24 is enlargeable when the handle 18 is put into play.

The handle 18 is further secured relative to the web 10 by means of a further web or tape 28 which underlies the end portions 20, 22 of the handle 18 and is bonded thereto. A central portion of the tape 28 is bonded to the underside of the web 12.

Although it is feasible that the handle assembly 10 be applied to the upper surface of an outermost closure panel for a container, in accordance with this invention, the handle assembly 10 is applied in an inverted relation with respect to the underside of a closure panel 30 of a carton, generally identified by the numeral 32. The closure panel 30 is provided with a cutout 34 through which the handle central portion 24 may project for engagement by an ultimate user.

At this time it is pointed out that the container or carton 32 will normally be provided with a first pair of oppositely directed closure panels or flaps 36 and then a further closure panel 38 which is disposed in oppositely facing direction with respect to the closure panel 30.

Figure 7:
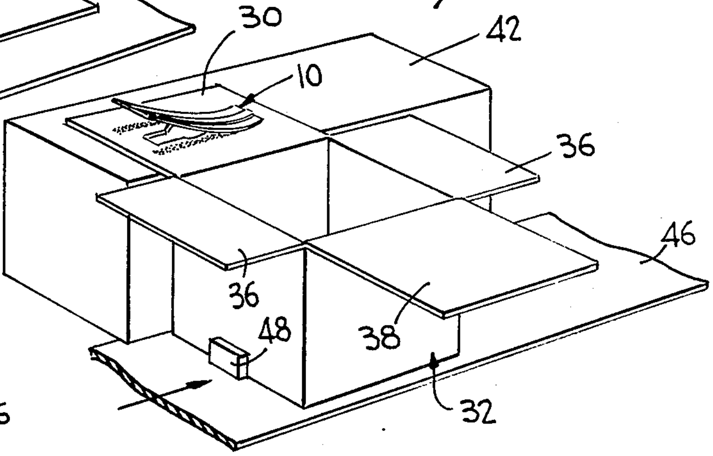
FIG. 7 is another schematic perspective view similar to FIG. 6 and showing a typical handle in the process of being bonded to a closure panel.
Figure 8:
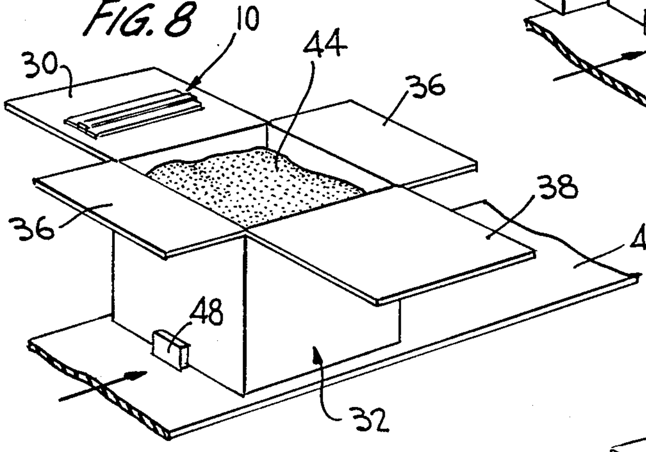
FIG. 8 is still another schematic perspective view similar to FIG. 6 showing the handle completely applied to the closure panel and the container filled with a product.
Figure 9:
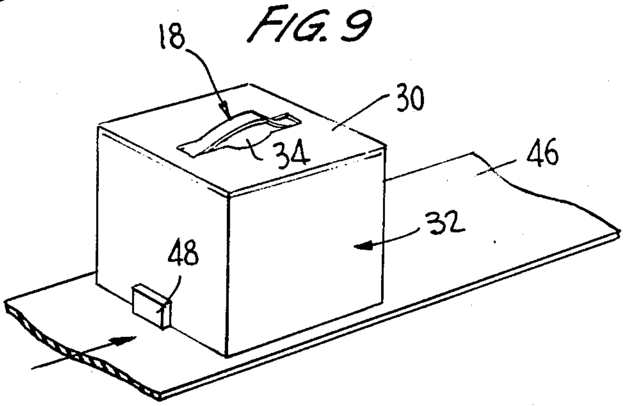
FIG. 9 is yet another schematic perspective view showing the completed package.

With reference to FIGS. 6–9, it will be seen that two stripes of hot melt adhesive 40 will be applied to the underside of the closure panel 30, which underside is facing upwardly in the unclosed position of the container 32. Then the handle assembly 10 is progressively applied to the closure panel 30 while the closure panel 30 overlies a suitable support 42. At this stage the container 32 may either by filled or filling may occur after the handle assembly 10 is applied, as is shown in FIG. 8. In any event, the container 32 receives a product 44 before it is closed.

The container 32 is closed by first folding over the closure flaps 36, followed by the folding over of the closure panel 38 and finally the closure panel 30. It is to be understood that the closure panel 38 will be preferably bonded to the closure flaps 36 and thereafter the closure panel 30 will be bonded to the closure panel 38.

At this time, a modification is feasible. In lieu of the closure panel 30 being the outermost closure panel of the closed upper end of the container, the closure panel 38 could be the outermost closure panel. In such event, the closure panel 38 would require an opening therethrough similar to the opening 34.

It is to be understood that the cartons or containers 32 will move at a uniform rate and most particularly at a uniform spacing. This is accomplished by suitable conveyor means, such as a belt conveyor 46. Preferably the belt conveyor 46 will be provided with suitable lugs 48 at regularly spaced intervals.

Figure 1:
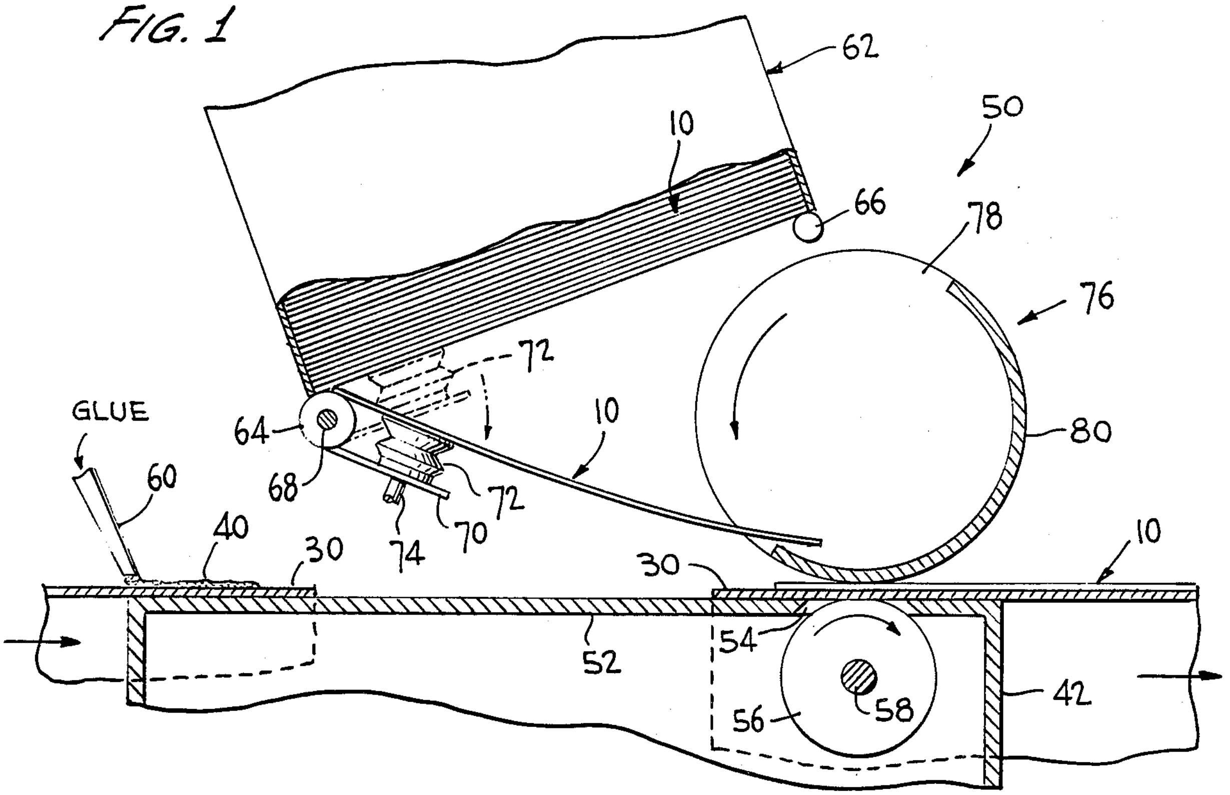
FIG. 1 is a side elevational view with parts broken away and shown in section of the applicator formed in accordance with this invention.
Figure 3:
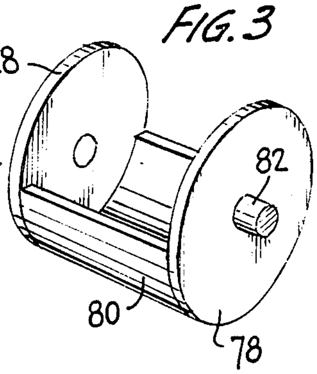
FIG. 3 is a perspective view of a combined guide and presser member on a reduced scale.
Figure 2:
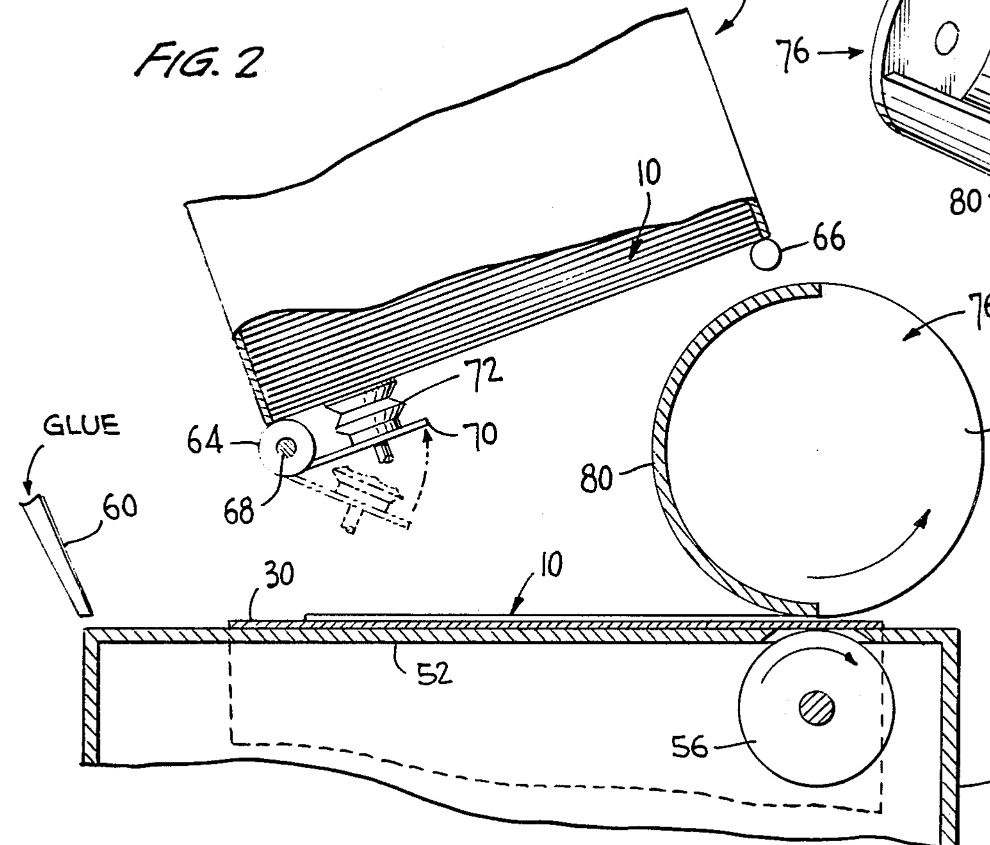
FIG. 2 is a side elevational view similar to FIG. 1 but showing a previously withdrawn handle being applied and picker means returning to engage a next lower handle in the hopper.

Reference is now made to the applicator, the structure of which is shown in FIGS. 1–3. The applicator is generally identified by the numeral 50 and functions to automatically apply a handle assembly 10 to each of the closure panels 30.

As is clearly shown in FIG. 7, the erected container 10 with the top thereof open is passed by the conveyor belt 46 along side the support 42. Each closure panel 30 moves over the support 42 with the closure panels 30 of adjacent containers 32 being regularly spaced.

The support 42 includes an upper fixed supporting surface 52 and adjacent the downstream end of the supporting surface 52 there is an opening 54 through which a support roller 56 projects. The surface of the support roller 56 is substantially flush, but may project slightly above the support surface 52. The support roller 56 is provided with a shaft 58 which is driven by means not shown at the same peripheral rate as the movement of the conveyor belt 46.

At or adjacent to the upstream end of the support 42 is a twin head adhesive applicator 60 for applying the two streams of hot melt adhesive 40 to the closure panel 30.

A hopper, generally identified by the numeral 62, overlies the support 42 in longitudinal alignment with the path of the openings 34 in the closure panels 30. The hopper 62 is of a conventional construction and has a plurality of handle assemblies 10 mounted thereon. Basically, the lowermost handle assembly 10 is retained within the open bottom of the hopper 62 by rounded supports 64, 66. The support 64 is carried by a shaft 68 for oscillatory movement while the support 66 is stationary.

The support 64 carries an arm 70 which, in turn, carries a bellows type suction cup which is connected by means of a hose 74 to a vacuum source. The suction cup 72 forms picker means for picking a lowermost handle assembly 10 from the hopper 62 and while grasping the left hand of such removed handle assembly 10, draws the right end downwardly and away from the hopper 62 towards the support 42.

A further and most important component of the apparatus 50 is a combined guide and presser member generally identified by the reference numeral 76. The member 76 is provided with two circular ends 78 which are joined by a half cylindrical part 80. The member 76 is provided with a suitable shaft 82 which mounts the member 76 for continuous rotation at a peripheral speed corresponding to the peripheral speed of the roller 56 and the conveyor belt 46.

The two circular ends 78 of the member 76 are spaced apart a distance slightly greater than the width of a handle assembly. Further, the circumferential extent of the part cylindrical portion 80 is substantially equal to the length of the handle assembly 10.

At this time it is pointed out that the conveyor belt 46, the support roller 56 and the combined guide and presser member 76 are all rotated in unison and in timed relation so that the closure panel 30 is properly positioned for receiving a handle assembly 10. Further, the adhesive applicator 60 is actuated in timed relation to the movement of a closure panel 30 therebeneath as is shown at the left of FIG. 1. Finally, the shaft 68 is oscillated at intervals in timed relation to the movement of the conveyor belt.

In FIG. 1, it will be seen that the combined guide and presser member 76 is in the process of applying a previously removed handle assembly 10 to a leading closure panel 30. At this time a next lowermost handle assembly 10 has just been withdrawn from the hopper 62 and has moved down between the end member 78 in guided relation. This maintains the withdrawn handle assembly 10 in longitudinal alignment with the previously formed opening 34 and the applied stripes of adhesive 40.

The suction head 72 will hold the last removed handle assembly in the general position shown in FIG. 1 until the closure panel 30 to which the adhesive stripes 40 are being applied at the left of FIG. 1 moves under the member 76. At that time, the leading edge of the rotating part cylindrical portion 80 will ride down on the right hand end of the removed handle assembly 10 when it is in alignment with the beginning of the adhesive stripes 40. At the same time, the vacuum to the suction cup 72 will be released and the handle assembly 10 will be progressively applied to the closure panel 30. After the handle assembly 10 which is being applied is drawn to the right of the suction cup 72, the picker means will return to its dotted line position of FIG. 1 to engage the next lower handle assembly 10.

With reference to FIG. 2, it will be seen that the picker means will remain stationary with the suction cup 72 engaging the lowermost handle assembly 10 until the open part of the combined guide and presser member 76 underlies the right end portion of the hopper 62 for receiving the next lower handle assembly 10, at which time the shaft 68 will again rotate to draw the picker means downwardly with the right end of the removed handle assembly 10 moving between the ends 78 of the member 76 ready to repeat the application of a handle assembly.

As set forth above, the apparatus and method of this invention is primarily directed to the application of handle assemblies to erected containers and cartons. In actual practice, with respect to a family size detergent carton, the cartons may be formed at three times the prior speed while the handle assemblies may be applied readily at the speed of erecting and filling such cartons.

Further, while the invention is particularly adapted to the application of handle assemblies of the type specifically illustrated and described, it is to be understood that various types of elongated members may be applied to moving surfaces in accordance with this invention.

Although only a preferred embodiment of the applicator has been specifically illustrated and described, it is to be understood that minor variations may be made in the structure of the applicator without departing from the spirit and scope of the invention as defined by the appended claims.

I claim:

1. An applicator for applying elongated strip members to a moving member, said applicator comprising a hopper having an upstream end and a downstream end, moving means for moving a member along a predetermined path, a rotating combined guide and presser member at the downstream end of said hopper overlying said predetermined path, and picker means at the upstream end of said hopper for removing an elongated strip member from said hopper and holding a removed elongated strip member adjacent one end of such elongated strip member while engaging an opposite end of such strip member in guided relation with said combined guide and presser member, and utilizing said combined guide and presser member to first laterally guide the strip member as it moves towards the moving member and then to press the strip member against the moving member.

2. An applicator according to claim 1 wherein said combined guide and presser member is in the form of a hollow roller including ends and a cylindrical body, said cylindrical body having only a partial cylindrical extent whereby a removed elongated strip member has the opposite end thereof received within said roller between said ends in guided relation.

3. An applicator according to claim 2 wherein the circumferential extent of said body corresponds generally to the length of the intended strip member.

4. An applicator according to claim 2 wherein a support roller underlies and opposes said combined guide and presser member.

5. An applicator according to claim 1 wherein said combined guide and presser member underlies said hopper remote from said picker means.

6. An applicator according to claim 5 wherein said picker means includes a support pivotally mounted relative to said hopper and carrying a suction head.

7. An applicator according to claim 1 wherein said combined guide and presser member has a circumferential rate of movement corresponding to the linear rate of movement of said moving means.

8. An applicator according to claim 1 wherein there is an adhesive applicator positioned along said path in longitudinal alignment with and in advance of said hopper.

9. An applicator according to claim 1 wherein said hopper is configurated to dispense handle members for attachment to cartons.

10. A method of applying an elongated strip member to a moving member, said method comprising the steps of providing a hopper having an upstream end and a downstream end, providing a picker at the upstream end of the hopper and a combined guide and presser member at the downstream end of the hopper, positioning strip members in the hopper, utilizing the picker means engaging a lowermost strip member in the hopper adjacent the upstream end of the hopper and withdrawing the lowermost strip member from the hopper while engaging an end of the withdrawn strip member remote from the picker means adjacent the downstream end of the hopper with the combined guide and presser member, feeding a moving member beneath the hopper and in underlying relation to the combined guide and presser member, and thereafter utilizing the combined guide and presser member first to laterally guide the withdrawn strip member as it moves towards the moving member, then to press the guided removed strip member against the moving member and thereafter to release the picker means from the removed strip member.

11. A method according to claim 10 wherein adhesive is applied to the moving member in alignment with an intended position of a strip member, and the removed strip member is pressed against the adhesive.

12. A method according to claim 10 wherein the strip member is in the form of a handle.

* * * * *